United States Patent [19]

Smith et al.

[11] Patent Number: 5,108,773

[45] Date of Patent: Apr. 28, 1992

[54] METHOD OF MAKING A NON-FAT CREAM CHEESE PRODUCT

[75] Inventors: David A. Smith, Vernon Hills; Kathleen M. Clark, Northbrook; Mark F. Firary, Evanston, all of Ill.

[73] Assignee: Kraft General Foods, Inc., Glenview, Ill.

[21] Appl. No.: 657,479

[22] Filed: Feb. 19, 1991

[51] Int. Cl.[5] .................... A23C 19/09; A23L 1/0534
[52] U.S. Cl. .................. 426/582; 426/573; 426/578; 426/587; 426/588
[58] Field of Search .............. 426/582, 587, 573, 578, 426/588

[56] References Cited

U.S. PATENT DOCUMENTS 3,023,104  2/1962  Battista ........................ 426/549
4,244,983  1/1981  Baker .......................... 426/582
4,341,807  7/1982  Turbak et al. .................. 426/573

OTHER PUBLICATIONS

McGraw Hill Encyclopedia of Science and Technology, vol. 3, pp. 384–385 (1987).

Primary Examiner—Donald E. Czaja
Assistant Examiner—Helen Pratt
Attorney, Agent, or Firm—Fitch, Even, Tabin & Flannery

[57] ABSTRACT

In the method of the present invention for making a non-fat cream cheese product, microcrystalline cellulose is blended with a source of concentrated skim milk and is mixed to provide a slurry. The slurry is subjected to high pressure, high shear homogenization treatment so as to microfluidize the components of the slurry and provide a microreticulated microcrystalline cellulose dispersion having a high viscosity. The final cream cheese formulation is then prepared by adding skim milk curd to the microfluidized slurry and adding the remaining ingredients, including spices, flavors, starch and a gum, to provide the non-fat cream cheese product of the invention.

11 Claims, 1 Drawing Sheet

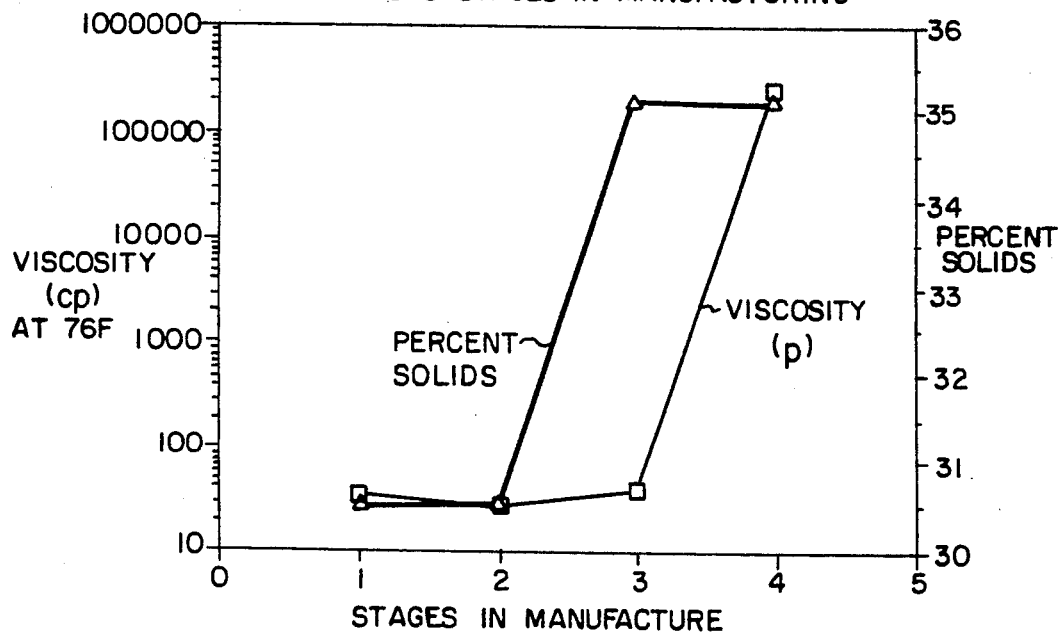

METHOD OF MAKING A NON-FAT CREAM CHEESE PRODUCT

FIELD OF THE INVENTION

The present invention is directed to a non-fat cream cheese product and to a method for manufacture thereof. Generally, the method includes the steps of combining a concentrated skim milk source with microcrystalline cellulose and subjecting the mixture to a microfluidizing treatment. The treated mixture is combined with skim milk curd and various gums in a series of steps to produce a non-fat cream cheese product that resembles a reduced fat or full fat cream cheese in texture, taste and mouthfeel.

BACKGROUND OF THE INVENTION

Cream cheese is a soft, mild acid-coagulated uncured cheese made of cream or from a mixture of cream and milk. Cream cheese is stored under refrigeration conditions and the body of cream cheese is smooth and butter-like. The texture and body of cream cheese at refrigeration temperatures is such that the cream cheese can be sliced and spread. In making cream cheese, sweet whole milk and/or skim milk and sweet cream are blended in pre-selected proportions to form a cream cheese mix. The cream cheese mix normally has a butterfat content of from about 10% to about 14%. After processing, the finished cream cheese has a butterfat content of from about 33% to about 35% by weight.

The cream cheese mix is pasteurized and homogenized after which it is cooled, usually to a temperature between 62° F. and 92° F. and is then inoculated with a lactic acid culture. Rennet may be used to aid the coagulation of the mix. The mix is held at the inoculation temperature until it has ripened and a coagulum is formed. The acidity of the coagulum is from about 0.6% to about 0.9% (calculated as percent equivalent lactic acid).

After the desired acidity is obtained, the curd is separated from the whey and is thereafter packaged. One well known process for making cream cheese and separating cream cheese curd from whey includes a mechanical separation of the curd. This process is disclosed in U.S. Pat. No. 2,387,276 to Link. In accordance with the method of the Link patent, after the mix is ripened to form a coagulum, the coagulum is heated to an elevated temperature to break the viscosity of the mix. Thereafter, the heated mix is centrifuged at the elevated temperature to separate the curd from the whey.

There have been many efforts to provide a cream cheese type product which has the texture, smoothness and organoleptic properties of cream cheese, but with reduced levels of fat. With increasing consumer awareness, the focal point is on reducing fat and calorie consumption. Low fat, low calorie foods which look and taste similar to their full fat, higher calorie counterparts are eagerly sought by the consumer. Researchers in the food industry have concentrated on developing food products which are nutritious and palatable, containing substantially reduced levels of high calorie, fat containing ingredients. This is particularly true in the dairy industry where low calorie, low-fat products such as skim milk, yogurt and reduced fat ice cream have been successfully marketed.

The high fat levels in some dairy products, such as cream cheese which has a fat content of at least about 33%, have been thought to be necessary to maintain a desirable creamy mouthfeel and to avoid the grainy texture associated with prior attempts at producing low fat cream cheese products.

Many efforts have been made to develop imitation cream cheese products which contain reduced fat levels. Examples of such efforts are disclosed in U.S. Pat. No. 2,161,159 to Lundstedt, et al. and U.S. Pat. No. 3,929,892 to Hynes, et al. However, the fat content of the cream cheese products produced by the methods of these patents still exceed about 10% fat. It would be desirable to reduce the fat content well below 10%. In particular, it would be highly desirable to provide a non-fat cream cheese product.

More recently, methods have been developed for making very low butterfat content imitation cream cheese products having low calorie contents which are intended for diet conscious consumers. U.S. Pat. No. 4,244,983 to Baker and U.S. Pat. No. 4,379,175 to Baker disclose imitation cream cheese products and a method for their manufacture having butterfat content of less than about 5%, preferably less than about 2% and which have about 60 calories per serving. However, as admitted by the inventor of these patents, in U.S. Pat. No. 4,724,152 to Baker, that, while the very low butterfat content of these products is desirable, the products do not closely duplicate the creamy and full-bodied consistency of full fat cream cheese.

U.S. Pat. No. 4,724,152 to Baker describes a method for making a low fat cream cheese product. The method includes the steps of admixing milk, a fat-containing carrier and non-fat dry milk solids to form a dressing mixture. The dressing mixture is pasteurized and homogenized and is thereafter heated to a temperature in the range of from about 145° to about 195° F., preferably 165° to 190° F., with constant agitation. A stabilizer is admixed into the mixture. Thereafter, while maintaining the temperature of the mixture in a range of 150° to 175° F., soft unripened cultured cheese curd, such as cottage or baker's cheese curd is added to the stabilizer-containing dressing mix. The admixture is pumped to a homogenizer where it is homogenized under conventional elevated pressure conditions of 500 to 5000 psig, preferably 1500 to 3000 psig. Following homogenization, the imitation cream cheese product, at temperatures of at least 40° F., is packaged into convenient packages.

While the '152 Baker patent provides a cream cheese product with reduced fat, i.e., a fat level in the range of 2 to 9% by weight, the Baker patent does not provide a non-fat cream cheese product.

Accordingly, it is a principal object of the present invention to provide a non-fat cream cheese type product, having the appearance, taste, consistency and texture of fat-containing cream cheese.

It is another object to provide a method for making an imitation cream cheese product which has substantially no fat and which is adapted to large scale commercial operations.

These and other objects of the invention will become more apparent from the following detailed description.

DESCRIPTION OF THE DRAWINGS

FIG. 1 is a plot of viscosity and solids at various stages of manufacture of the non-fat cream cheese of the invention.

SUMMARY OF THE INVENTION

In the method of the present invention for making a non-fat cream cheese product, microcrystalline cellulose is blended with a source of concentrated skim milk and is mixed to provide a slurry. The slurry is subjected to high pressure, high shear homogenization treatment so as to microfluidize the components of the slurry and provide a microreticulated microcrystalline cellulose dispersion having a high viscosity. The final cream cheese formulation is then prepared by adding skim milk curd to the microfluidized slurry and adding the remaining ingredients, including spices, flavors, starch and a gum, to provide the non-fat cream cheese product of the invention.

While the cream cheese product of the present invention is characterized as being a non-fat product, from a practical standpoint it is impossible to remove all butterfat from milk in ordinary commercial cream separation processes. Usually, a few tenths of a percent of butterfat remains in the skim milk after separating cream from the milk in the most efficient separators, i.e., skim milk usually has from about 0.05% to about 0.3% of fat. When the skim milk is further concentrated, such as by providing a skim milk retentate or dry curd cottage cheese, the butterfat content is increased in proportion to the degree of concentration. Accordingly, the non-fat cream cheese product of the present invention has from about 0.05 to about 1.5% butterfat in the final cream cheese product.

DETAILED DESCRIPTION OF THE INVENTION

Generally, in accordance with the invention, a source of concentrated skim milk is first provided. The concentrated skim milk preferably has a non-fat milk solids content of from about 20% to about 30%. All percentages used herein are by weight, dry basis, based on the weight of the final non-fat cream cheese product, and all temperatures are in °F. unless otherwise indicated. The source of concentrated skim milk can be from a variety of operations. The concentrated skim milk can be produced by evaporation, by ultrafiltration treatment to provide a skim milk retentate and by reconstitution of dried skim milk.

The skim milk used to provide the concentrated skim milk source may be subjected to well known heat treatment conditions to co-precipitate the serum proteins with the casein during preparation of the dry cottage cheese curd. Such conditions are taught in U.S. Pat. No. 3,039,879 to Vakaleris.

The present invention is directed to a substantially fat-free, cream cheese type product, having an organoleptic fat-like characteristic closely simulating cream cheese which has a relatively high fat content. The fat-free cream cheese food product of the invention utilizes microcrystalline cellulose which has been dispersed in the concentrated skim milk and which has been microfluidized to provide a microreticulated microcrystalline cellulose skim milk dispersion having specific viscosity, particle size, and microreticulation characteristics, as will be described in more detail. Microreticulated microcrystalline cellulose produced from aqueous dispersions are generally described in U.S. patent application Ser. No. 395,800 filed Aug. 18, 1989 now U.S. Pat. No. 5,011,701, the teachings of which are incorporated herein by reference.

Generally, the cream cheese product of the invention will comprise from about 2 to about 6 weight percent of dispersed, porous, particulate, microreticulated microcrystalline cellulose, from about 10 to about 16 weight percent concentrated skim milk, from about 32 to about 42 weight percent of non-fat milk solids provided from the concentrated skim milk, from about 32 to about 42 weight percent of skim milk curd, and less than about 1.5 weight percent fat.

Skim milk curd, such as dry cultured cottage cheese curd, is a well known dairy product which is a drained, uncreamed skim milk cheese curd made by inoculating skim milk with culture and allowing the product to coagulate. After a coagulum is formed, the coagulum is cut to provide curd and whey and the whey is drained to provide the dry cottage cheese curd. The dry cottage cheese curd is usually combined with a creaming mixture to provide creamed cottage cheeses for commercial distribution. Dry cottage cheese curd may also be made by a direct acidification method. Generally, dry cottage cheese curd comprises from about 15% to about 25% by weight non-fat milk solids and about 75% to about 85% by weight water. When used herein, the term "dry cottage cheese curd" or "skim milk curd" refers to a soft cheese curd such as cottage cheese or baker's cheese curd product having the above solids and moisture characteristics.

As indicated, the microreticulated microcrystalline cellulose is particulate, and has a particle size distribution such that substantially all (i.e., at least about 75 weight percent) of the microreticulated microcrystalline cellulose particles are porous, and in this regard, have a void volume of at least about 25 volume percent, preferably at least about 50 volume percent of the particles. The microreticulated microcrystalline cellulose particles of the high viscosity aqueous dispersions are believed to be an intimately interconnected product of microfragmented microcrystalline cellulose which has reagglomerated under controlled conditions to form stable, porous particles of microcrystalline particle fragments which are connected at spaced-apart zones of contact through crystalline bonding forces. The microreticulated particles of the aqueous dispersion desirably have a mean particle size in the range of from about 2 to about 25 microns, and desirably, at least about 50 percent by weight of the microreticulated microcrystalline cellulose particles of the aqueous dispersion have a maximum linear dimension in the range of from about 2 to about 25 microns and preferably in the range of from about 5 to about 20 microns.

It is important that the microreticulated cellulose be prepared from the highly crystalline microcrystalline cellulose. Microcrystalline celluloses are conventionally prepared from wood pulp by acid hydrolysis of cellulose fiber which weakens the disordered para-crystalline region. Subsequent shearing releases the insoluble, highly crystalline cellulose bundles. [Thomas, W. R., "Microcrystalline Cellulose (MCC or Cellulose Gel)", Food Hydrocolloids, Vol. III (Ed., M. Glickman), pp. 9–42 (1986), CRC Press, Inc., Boca Raton, Fla.; "Avicel Microcrystalline Cellulose—Product Description", Technical Bulletin G-34, FMC Corporation, Food & Pharmaceutical Products Division, Philadelphia (1985)]. Cellulose is a linear polymer of $\beta$1–4 linked D-glucose units. Because of the linear nature of cellulose which allows close contact of adjacent chains, as well as an abundance of hydroxyl groups available for hydrogen bonding between chains, cellulose readily forms bundles of molecules which further interact to form fibrils. Although much of the cellulose found in nature is arranged in tightly packed crystalline regions, these are interspersed with less densely packed amorphous areas, called para-crystalline regions. In the typical manufacture of microcrystalline cellulose, acid hydrolysis is utilized to attack the para-crystalline regions, followed by a process of attrition (a high shear treatment), to break out the microcrystalline regions. Because of their highly crystalline nature, the microcrystalline cellulose particles have a strong tendency to recrystallize after being broken apart.

In the formation of the microreticulated microcrystalline cellulose materials, it is believed that the generally solid microcrystalline cellulose crystallites are progressively converted to porous microreticulated particles of specific size distribution by a process of controlled microfragmentation and reagglomeration.

The microreticulated microcrystalline cellulose dispersions of the invention are produced by providing a slurry of microcrystalline cellulose comprising from about 88 to about 96 percent concentrated skim milk and from about 4 to about 12 weight percent microcrystalline cellulose, and preferably from about 6 to about 10 weight percent of microcrystalline cellulose, based on the weight of the suspension. The concentrated skim milk should have a non-fat milk solids level of from about 15 to about 30 percent.

The microcrystalline cellulose slurry is repeatedly conducted through a superpressure, high shear zone to fragment the microcrystalline cellulose to crystalline fragments having a maximum dimension of less than about 1 micron, and reagglomerating the submicron crystalline fragments under high shear conditions at a very small turbulence scale, to produce porous microreticulated microcrystalline cellulose particles having the desired particle size distribution. By "superpressure high shear zone" is meant a shear zone operated at a driving pressure drop of at least 12,000 psi which is dissipated viscously to heat. The slurry may be conducted through the superpressure high shear zone more than once. In this regard, the slurry is preferably conducted at least twice through a high shear zone and most preferably is conducted three times through the high shear zone.

The microcrystalline cellulose slurry should best be conducted through a high shear zone having a shear rate of at least about $5 \times 10^6$ (e.g., $1 \times 10^7$) seconds$^{-1}$ at a specific turbulent energy dissipation rate of at least about $8.5 \times 10^5$ ergs per cubic centimeter of the high shear zone. Preferably, all of the microcrystalline cellulose slurry is conducted serially through the superpressure high velocity and shear fragmentation zone, so that all of the material which has passed through one stage of processing is conducted to the next stage of processing. However, processing may also be carried out by recycle in a stirred tank reactor mode, which however is not as efficient. In a flow through system with continuous high shear treatment, the specific energy requirement (the energy dissipation rate per unit throughput of product stream) may desirably be at least about $1 \times 10^8$ ergs per gram. Preferably, a turbulent energy dissipation rate of at least about $4 \times 10^{11}$ ergs per pound of aqueous dispersion is provided per pass through the high shear, high velocity zone. The kinetic and shearing forces are dissipated and converted viscously to heat and fragmentation of the microcrystalline cellulose, and the temperature of the dispersion should rise at least about 30° C. upon conduction through the superpressure microfragmentation zone.

The superpressure high shear zone should best have a shear rate of at least about $1 \times 10^7$ inverse seconds, with a turbulent energy dissipation rate sufficient to raise the temperature of the suspension at least about 30° C. through viscous dissipation of input energy to heat.

As indicated, microreticulated microcrystalline cellulose dispersions may be prepared by subjecting a concentrated skim milk slurry or suspension of the microcrystalline cellulose to intense shear at very high driving pressures to provide the microfragmentation and microporous reagglomeration treatment. Effective results have been achieved using a Rannie homogenizer (A.P.V. Rannie, Copenhagen) using a knife edge homogenization element within a closely surrounding impact ring at an inlet pressure of at least about 12,000 psig and preferably at least 13,000 psig, to obtain microporously reagglomerated microfragments having a mean particle size in the range of from about 5 microns to about 15 microns in maximum dimension.

The concentrated skim milk is removed from a holding tank and is introduced into a mixer. Microcrystalline cellulose, such as Avicel ® FD-305, manufactured by FMC Corporation, is added to the mixer. The concentrated skim milk is agitated in the mixer to provide a slurry of the microcrystalline cellulose in the skim milk.

The slurry is then microfluidized in a suitable high shear homogenizer, such as a Rannie homogenizer, at a pressure of at least about 12,000 psig. After being subjected to high shear homogenization, the viscosity of the skim milk slurry is substantially increased. As shown in FIG. 1, the viscosity after conventional low pressure homogenization at 2,000 psig (shown at stage 3) is only slightly increased. After high shear homogenization (stage 4), the viscosity is increased by 3 orders of magnitude to provide a product resembling cream cheese curd in appearance and texture. While not wishing to be bound by any theory, it is believed that the high shear homogenization at high pressure causes an irreversible physical reaction to occur between the protein of the skim milk and the microreticulated microcrystalline cellulose which is produced during the high shear homogenization.

During high shear homogenization, the temperature of the skim milk slurry increases by from about 20° F. to about 30° F. When using a series of three high shear homogenizers, such temperature increase can be used to raise the temperature of the skim milk slurry to within the range of from about 160° F. to about 175° F. Such increase in temperature to within the indicated range serves to pasteurize the skim milk slurry and no further outside heat source is required. After the skim milk slurry passes through the third high shear homogenizer, the skim milk slurry is transferred to a suitable mixer, such as a Pfaudler mixer, for combining with the skim milk curd.

The skim milk curd, such as dry curd cottage cheese, is blended with water in a separate mixer to provide a pumpable fluid consistency to the dry curd cottage cheese. From about 10 percent to about 20 percent of water, based on the weight of the dry curd cottage cheese, is sufficient for this purpose. The dry cottage cheese curd is then pumped to the mixer containing the treated skim milk slurry.

The remaining ingredients, including starch, gum, salt, coloring, preservatives, spices, flavors, vitamins and minerals, are then added. The starch and gum are added last. When using a series of three high shear homogenizers, or repeated passes through a single high shear homogenizer, at least part of the gum may be added to the skim milk slurry prior to conducting the skim milk slurry through the third high shear mixer. After the addition of the starch and gum, mixing is continued for a period of from about 5 to about 10 minutes to gelatinize the starch. Of course, if pregelatinized starch is used, the holding period after addition of the starch can be greatly reduced. The mixture is then transferred through a low pressure homogenizer at a pressure of from about 1000 psig to about 3000 psig to assist in hydrating the gum and hydrolyzing the starch.

The gum is added at a level of from about 0.1% to about 2.0%. The gum added in the process is preferably a mixture of xanthan and carrageenan gum, and each gum is added at a level of from about 0.05% to about 1.0%. The gum or combination of gums employed in the process may be selected from any of a number of commercially available dairy product gums. Typical useful gums are hydrocolloids, such as xanthan, carrageenan, guar gum, carob bean gum, alginic acid and sodium and calcium salts thereof, gum arabic, gum tragacanth, carboxymethyl cellulose and pectin.

The starch may be any food starch, such as corn starch, potato starch, rice starch or tapioca starch. The starch used in the compositions of the present invention is preferably modified tapioca starch, either a native or a pregelatinized cornstarch. The starch is preferably pregelatinized to provide further ease in the preparation of the cream cheese product of the invention, although native ungelatinized starch may be used. "Modified" starch is a term well understood in the food art. Modified starches are described in 21 CFR §172.892. The term "modified starch" is readily understood by those skilled in the art and modified starches are suitable for use in the present invention.

The non-fat cream cheese product of the invention typically has the following components at the indicate range of use:

| Component | Level of Use |
| --- | --- |
| Concentrated skim: milk (20%–30% non-fat milk solids) | 35%–60% |
| Microcrystalline cellulose | 0.25%–4% |
| Dry curd cottage cheese (skim milk curd) | 32%–42% |
| Starch | 0.5%–3% |
| Gum | 0.5%–1.5% |
| Flavors, coloring, spices, preservatives | 0.5%–1.50% |
| Protein (from concentrated skim milk and dry curd cottage cheese) | 8%–15% |
| Water | q.s. |

The following example further illustrates various features of the invention, but is not intended in any way to limit the scope of the invention as defined in the appended claims.

EXAMPLE 1

A condensed skim milk is provided having 30% non-fat milk solids. The skim milk is introduced into a mixer and is blended with water and microcrystalline cellulose (Avicel® FD-305 manufactured by FMC Corporation) to provide a slurry having 8% microcrystalline cellulose and 27.2% non-fat milk solids. The slurry is at a temperature of 60° F. and is microfluidized by passing the slurry through a series of two Rannie homogenizers at a pressure of 13,500 psig at a rate of 2415 pounds per hour. The slurry enters the first homogenizer at a pressure of 150 psig and the temperature of the slurry increases 40° F. after passage through each homogenizer. The resulting slurry has visibly thickened (30,000 cp) and has a consistency similar to cooked oatmeal after passage through the second homogenizer. The thickened slurry is collected in a surge tank and the temperature is adjusted to 140° F. by adjusting the retention of the slurry in the tank to a suitable period of time. The slurry is then passed through a third Rannie homogenizer at a rate of 2722 pounds per hour. Prior to being introduced into the third Rannie homogenizer, xanthan gum is fed into the slurry at a rate of 18.7 pounds per hour.

The final non-fat cream cheese formulation is prepared by pumping the thickened slurry to a Pfaudler mixer where dry curd cottage cheese mixed with 15% of water is added and mixed with the slurry at a rate of 2740 pounds per hour. Spices, flavors, color, preservative, corn syrup solids, malto dextrins, tapioca starch and gums are added to provide the formulation set forth in Table I. Mixing is continued for 5 to 10 minutes after the starch and gum are added.

TABLE I

| Ingredient | Weight Percent |
| --- | --- |
| Avicel/skim milk slurry | 44.159 |
| Cottage Cheese Slurry | 44.700 |
| Corn Syrup Solids (24 DE) | 2.000 |
| Soybean Oil | 1.000 |
| Modified Tapioca Starch | 0.500 |
| Malto Dextrin | 0.500 |
| Salt | 0.500 |
| $TiO_2$ | 0.500 |
| Lactic acid | 0.280 |
| Iota Carrageenan | 0.210 |
| Kappa Carrageenan | 0.210 |
| Flavor | 0.201 |
| Sorbic Acid | 0.100 |
| Disodium Phosphate | 0.100 |
| Vitamin A Palmitate | 0.040 |
| Total | 100.000 |

The mixture was then passed through a Gaulin homogenizer at a pressure of 2000 psig and was vacuum deaerated to provide a non-fat cream cheese product.

The resulting non-fat cream cheese product was smooth and creamy in appearance. After packaging and cooling, the product had the appearance, taste and organoleptic properties of cream cheese having a high butterfat content of greater than 30%.

What is claimed is:

1. A method for manufacture of a non-fat cream cheese product comprising
   (a) blending a source of concentrated skim milk with microcrystalline cellulose to provide a slurry comprising from about 4 to about 12 weight percent of said microcrystalline cellulose in said skim milk;
   (b) shearing said slurry in a high shear zone having a pressure drop of at least 12,000 psi to fragment the microcrystalline cellulose to submicron sized microcrystalline cellulose fragments and reagglomerating the crystalline cellulose fragments under high shear conditions to produce an aqueous dispersion of porous microreticulated microcrystalline particles having a void volume of at least about 25 volume percent and having a mean particle size in the range of from about 2 to about 25 microns;

(c) combining said thickened slurry with skim milk curd to provide a pre-mix; and (d) combining said heated pre-mix with a starch and a gum to provide said non-fat cream cheese product.

2. A method in accordance with claim 1 wherein said shearing of said slurry is effected by conducting said slurry through a series of three high shear homogenizers.

3. A method in accordance with claim 2 wherein at least part of said gum is introduced into said slurry prior to conducting said slurry through the last of said series of homogenizers.

4. A method in accordance with claim 1 wherein said gum is selected from the group consisting of xanthan, carrageenan, guar gum, carob bean gum, alginic acid and sodium and calcium salts thereof, gum arabic, gum tragacanth, carboxymethyl cellulose and pectin.

5. A method in accordance with claim 1 wherein said starch is selected from the group consisting of corn starch, potato starch, rice starch and tapioca starch.

6. A method in accordance with claim 1 wherein said gum is present in said non-fat cream cheese product at a level of from about 0.1% to about 1.5%.

7. A method in accordance with claim 1 wherein said starch is present in said non-fat cream cheese product at a level of from about 0.5% to about 3%.

8. A method in accordance with claim 1 wherein said microcrystalline cellulose is present in said non-fat cream cheese product at a level of from about 0.25% to about 4%.

9. A method in accordance with claim 1 wherein said concentrated skim milk source has from about 20% to about 30% of non-fat milk solids and said concentrated skim milk source is present in said non-fat cream cheese at a level of from about 35% to about 60%.

10. A method in accordance with claim 1 wherein said skim milk curd is present in said non-fat cream cheese at a level of from about 32% to about 42%.

11. A method in accordance with claim 1 wherein said non-fat cream cheese has from about 8% to about 15% of protein.

* * * * *